United States Patent [19]
Araujo et al.

[11] Patent Number: 5,578,103
[45] Date of Patent: Nov. 26, 1996

[54] ALKALI METAL ION MIGRATION CONTROL

[75] Inventors: Roger J. Araujo, Horseheads; Norbert J. Binkowski, Bath; Francis P. Fehlner, Corning, all of N.Y.

[73] Assignee: Corning Incorporated, Corning, N.Y.

[21] Appl. No.: 292,068

[22] Filed: Aug. 17, 1994

[51] Int. Cl.⁶ .................................................. C03C 17/00
[52] U.S. Cl. .................. 65/60.5; 65/30.13; 65/60.53; 427/255; 428/428; 428/432; 359/74
[58] Field of Search .................. 65/60.5, 60.53, 65/30.13; 427/255; 428/428, 432; 359/74, 82

[56] References Cited

U.S. PATENT DOCUMENTS

| | | |
|---|---|---|
| 4,485,146 | 11/1984 | Mizuhashi et al. . |
| 4,828,880 | 5/1989 | Jenkins et al. . |
| 4,995,893 | 2/1991 | Jenkins et al. . |
| 5,393,593 | 2/1995 | Gulotta et al. ................ 428/428 |

FOREIGN PATENT DOCUMENTS

| | | |
|---|---|---|
| 0460966A2 | 7/1991 | European Pat. Off. . |
| 2144733 | 3/1985 | United Kingdom . |
| 2163146 | 2/1986 | United Kingdom . |

OTHER PUBLICATIONS

"Polycrystalline Silicon Thin–Film Transistors on a Novel 800° C. Glass Substrate", by Troxell et al., *IEEE Electron Device Letters*, vol. EDL–7, No. 11, (Nov. 1986), pp. 597–599.

"NMR Studies of Borates", by P. J. Bray, *Borate Glasses*, Plenum Press (1978) pp. 321–345.

*Primary Examiner*—Donald E. Czaja
*Assistant Examiner*—Michael P. Colaianni
*Attorney, Agent, or Firm*—Milton M. Peterson

[57] ABSTRACT

A materials system comprising a glass containing alkali metal ions capable of migrating and a silica, alumina, or tantala film deposited on the glass surface, the glass also containing high field strength ions that can change coordination. The direction of alkali metal ion flow depends on the film selected and the glass composition.

18 Claims, No Drawings

ALKALI METAL ION MIGRATION CONTROL

FIELD OF THE INVENTION

A materials system and method for controlling the direction of alkali metal ion migration between an oxide film and a glass.

BACKGROUND OF THE INVENTION

Migration of metal ions in a solid body, such as a glass, is a well recognized phenomenon. The alkali metal ions, $Li^+$, $Na^+$ and $K^+$, are generally the most mobile ions. The sodium ion ($Na^+$), being the most mobile of the alkali metal ions in silicate glasses, is of particular concern here.

Migration of ions, particularly $Na^+$, has considerable commercial significance. From a beneficial standpoint, the exchange of alkali metal ions at, and within, a glass surface is a well recognized mechanism for glass strengthening. On the other hand, the sodium ion is the most feared contaminant in the integrated circuit industry. It has a serious effect on electrical properties and behavior of materials.

An area of particular concern is liquid crystal display devices, whether passive or active. These devices customarily consist of thin, parallel, spaced glass panels with an intermediate, liquid crystal layer. A quite unrelated area of concern is chemical and pharmaceutical glass ware where high purity is often critical.

Initially, soda lime glass panels were used in producing passive liquid crystal display devices. When such panels were employed, degradation of the liquid crystal occurred at normal operating temperatures. Sodium ions at the glass surface exchanged for hydrogen ions, thus contaminating the liquid crystal.

To avoid this problem, a silica film was applied to the surface of the glass panel. This film acted as a barrier layer to stop sodium ion migration from the glass, and thus prevented exposure of the liquid crystal layer to the sodium ions.

Subsequently, panels were produced from a glass that contained no more than about 0.1% by weight $Na_2O$. Availability of these glass panels made it unnecessary to employ a barrier layer film in passive matrices. However, maintaining such low levels of alkali in a glass imposes severe limits on the physical properties of the glass.

Active matrix liquid crystal displays (AMLCDs) have recently become increasingly popular. These displays utilize either amorphous silicon or polysilicon thin film transistors. The use of a barrier layer is optional, although recommended, in conjunction with the former.

However, producing a polysilicon thin film transistor involves processing temperatures that approach the strain point of the glass. At these temperatures, sodium, even at the low level in the glass, creates a contamination problem. As a result, it is necessary to provide a barrier layer on the glass panel to prevent sodium ion migration that results in device instability.

Pending application Ser. No. 07/853,587 was filed Mar. 18, 1992, and refiled Oct. 5, 1993 as Ser. No. 08/132,554. Both were filed in the name of F. P. Fehlner and assigned to the assignee of the present application. These applications were based on the discovery that an inert, refractory oxide film can perform dual functions. Thus, such a film can function as both a barrier layer film against sodium migration, and as a parting agent to prevent glass adhesion during a compaction process. Thereafter, the barrier layer remains on the glass panel becoming part of the finished display device.

Heretofore, it had been assumed that sodium ion migration occurred only from a glass toward a barrier layer film having a smaller sodium ion concentration. The present invention is predicated on our discovery that this assumption is not correct. Rather, we have found that sodium ion migration can occur in either direction depending on certain factors. Our present invention is based on our determination of these factors, and, consequently, a mechanism for controlling the direction of ion migration.

SUMMARY OF THE INVENTION

The invention provides a materials system comprising a barrier layer oxide film selected from the group consisting of silica, alumina and tantala films deposited on a glass surface, the glass having a content of mobile alkali metal ions and a composition containing a sufficient amount of high field strength ions that can change coordination so that the following expressions, in cation percent values, $P^1=[Na^++Li^++K^++Cs^++Rb^+]+2[Sr^{2+}+Ba^{2+}+Ca^{2+}/2]-[Al^{3+}]$, in conjunction with an alumina or tantala film, and $P=P'-0.6[B^{3+}]-[Zn^{2+}+Be^{2+}+Mg^{2+}+Ca^{2+}/2]$, in in conjunction with a silica film, are negative, whereby the direction of any flow of a migrating alkali metal ion is toward the glass.

The invention further comprehends a method of preventing the migration of alkali metal ions from a glass surface which comprises depositing a barrier layer oxide film selected from the group consisting of silica, alumina and tantala films on a glass containing high field strength ions that can change coordination, an alumina or tantala film being applied in combination with a glass having a composition such that the expression, in cation percent, $P^1=[Na^++Li^++K^++Cs^++Rb^+]+2[Sr^{2+}+Ba^{2+}+Ca^{2+}/2]-[Al^{3+}]$, is negative, and a silica film being applied in combination with a glass having a composition such that the equation $P=P^1=0.6[B^{3+}]-[Zn^{2+}+Be^{2+}+Mg^{2+}+Ca^{2+}/2]$, is negative.

We have observed that, in the presence of moist air, and with an alumina film contacting a glass containing alkali metal ions, the ion flow depends on the sign of the expression $P^1$. Ion flow is from the glass into the film if $P^1$ is positive. Conversely, ion flow is from the film into the glass if $P^1$ is negative. A similar effect is observed with a silica film. If the value of the expression P is positive, ion flow is from the glass to the film. In contrast, if P is negative, ion flow is from film to glass.

The essence of the invention, then, is utilizing a combination of a glass having a defined composition with a particular oxide film to avoid alkali metal ion migration into the film. The combination must be such that $P^1$ is negative when the film is alumina, and that P is negative when the film is silica. Avoiding flow of ions from a glass into a film will normally avoid flow through the film to contaminate a liquid, a crystal, an integrated circuit, or a chemical in contact with the film.

Negative values of $P^1$ and P can be achieved by limiting the amounts of alkali metal and alkaline earth oxides in a glass. An important feature of the invention, however, is that negative values may also be achieved in glasses with relatively high contents of alkalies. This involves incorporating oxides of aluminum, boron, or other high field strength ions in the glass. This feature is important because it widens the range of physical properties that can be attained in a glass while avoiding the danger of alkali contamination. The mechanism of this effect of high field strength ions is discussed subsequently.

PRIOR ART

In addition to material noted in the Background, items of possible interest are listed in a separate document.

DESCRIPTION OF THE INVENTION

The use of glass substrates for the fabrication of thin film transistors (TFTs) has been a key factor in making AMLCDs a leader in flat display technology. However, most glass compositions, even those nominally alkali-free, contain sodium, if only at a tramp or impurity level of 1000 parts per million (ppm) by weight. This has led to a study of films to act as a barrier to sodium migration.

A high purity oxide film deposited onto a clean glass substrate, in the absence of an electric field, contains a lower sodium concentration than that in the glass substrate. At the high temperatures employed in processing AMLCDs, sodium would be expected to migrate into the barrier layer from the glass until establishment of an equilibrium, since the initial value in the glass is usually higher. The rate of movement would depend on the diffusion coefficients of the mobile species in the film and in the glass.

The present invention arose from discoveries made in the course of studying various combinations of barrier layer films and different low-sodium-content glasses for use in AMLCDs. Much to our surprise, we found that oxide films, deposited for example by atmospheric pressure chemical vapor deposition (APCVD), sometimes behaved in an unexpected manner.

In particular, when a silica film was deposited by APCVD on a boroaluminosilicate containing sodium ions, the concentration of sodium oxide at the outer surface of the heat treated film was as low as several ppm. This occurred despite the fact that a concentration gradient existed between the glass and the film. Diffusion theory would have predicted that the sodium concentration in the film should equal that in the glass due to diffusion during the heat treatment. It was evident that the direction of sodium migration was reversed. In other words, sodium ions migrated from the barrier layer film of silica, a region of low sodium ion concentration, into the glass, a region of high ion concentration.

Such reverse migration occurred consistently when a silica film, deposited from an atomized, or ionized, atmosphere, was employed as a barrier layer on a boroaluminosilicate glass having a very low soda content. However, when an alumina film was deposited in similar manner on the same glass, the direction of migration was from the glass into the barrier layer film. This is in the direction of the concentration gradient. In each case, temperatures employed were approximately those used in applying polysilicon transistors to the glass.

It became apparent that redistribution of sodium between a glass and a barrier layer film could not be understood solely in terms of concentration gradients of sodium. This is because the diffusion is related to the gradient of chemical potential. This is a more relevant factor that may, or may not, be in the same direction as the concentration gradient. Furthermore, in any process involving charge displacement, charge neutrality must be maintained. This may be either by counter movement of a cation, such as hydrogen, or by movement of an anion, such as oxygen, in the same direction as the sodium. We favor the hydrogen ion explanation.

Accordingly, the present experiments were carried out in air saturated with water vapor at room temperature. The temperature during redistribution must, of course, be high enough so that there is sufficient diffusivity of both sodium and hydrogen ions. Finally, there must be some thermodynamic driving force, in addition to concentration gradient, to explain the results.

Our studies lead us to ascribe the reason for sodium movement against a concentration gradient to the properties of certain glass structures. A treatise by P. J. Bray, "NMR Studies of Borates", in *Borate Glasses,* Plenum Press (1978) pp. 321–345, teaches that boron in a glass can change from 3 to 4 coordinate in the presence of charge compensating cations. This lowers the overall energy of the glass system. We predicate our invention on the concept of high field strength ions, such as aluminum, boron and tantalum ions, changing coordination.

We have found that, when protons and alkali ions exchange across a glass-oxide film interface, the choice of both the barrier film and the glass determines the direction of movement of the sodium ion. The presence of a hydrogen species is also required. Hydrogen exchange maintains charge neutrality when the sodium moves. Chemical potentials can be calculated based on the free energy of mixing in the film and glass.

Assuming a difference in bonding energy of the sodium in the film and in the glass, the choice of film and glass composition controls the movement of sodium. For a particular film, the presence of aluminum or boron in the glass accounts for the energy difference. This explains why sodium can move from a film with lower concentration into a glass with higher concentration. The aluminum and boron ions in the glass can change from three to four coordinate in the presence of charge compensating cations, thus acting as a sink for alkali.

Several empirical rules derived from glass composition work are of particular importance when applying the concept of charge-compensated, four coordinate atoms to the movement of sodium between a glass and a barrier layer. They can be summarized as follows:

1. Aluminum atoms in a silicate glass are four coordinate when charge compensating cations are present. In a glass containing both boron and aluminum atoms, the aluminum atoms are compensated first, then the borons, and finally the smaller alkaline earths that can enter the silica network.

2. In the case of an alumina film on a silicate glass containing Al and B, the Al in the glass appears to have a greater affinity for $Na^+$ than the alumina film. However, the film has a greater affinity for $Na^+$ than has the boron.

3. The creation of a four coordinate boron precludes the alternative, namely, the creation of a non-bridging oxygen (NBO). The $BO_{4/2}$ group exhibits a negative charge because the boron is bonded to four negative ions of oxygen.

4. Alkali metal, or large, low field strength, alkaline earth cations, are required to compensate the negative charge on the $AlO_{4/2}$ or $BO_{4/2}$. The alkali metal is more effective in doing this. Hydrogen, however, remains bound to NBOs and is not available for charge compensation of tetrahedral anions, such as B or Al.

5. Alkaline earth ions can act as either network modifiers or, in the presence of charge compensating cations, network formers. Low field ions, such as Ba and Sr, act like modifiers and can form two NBOs each. High field strength ions, like Be, Mg, and Zn, may enter the network in octahedral coordination provided charge compensating cations are present. Calcium can occupy either position in a glass, depending upon the composition.

Some simple rules can be used for predicting. The replacement of a proton by an alkali ion does not occur if it results in the replacement of a hydroxyl group with a non-bridging oxygen atom. However, it does occur if it gives rise to an increased number of tetrahedrally bonded aluminum atoms or boron atoms. In that case, the energy of the phase is decreased by the replacement, and movement of alkali metal ions into the glass is favored by thermodynamics. Certain high field strength ions, such as tantalum and phosphorus, exert the same influence as aluminum. They prevent the formation of non-bridging oxygen atoms by becoming more highly coordinated by oxygen atoms when alkali is introduced.

An energy decrease is expected to result from exchange of an alkali ion for a proton in any phase in which the concentration of aluminum atoms exceeds the concentration of alkali. If the alkali exceeds the aluminum, non-bridging oxygen atoms will be formed unless the glass contains boron. If the glass contains boron, then the ratio of the amount of excess alkali in the glass to the boron determines whether non-bridging oxygen atoms are formed. If the ratio is lower than the critical value, in the range of 0.5 to 0.7 as noted by Bray, tetrahedrally bonded boron is formed by the addition of a small increase in sodium concentration, and the energy of the phase is decreased. If the energy decrease which would occur in the glass is larger in absolute value than that which would occur in the form, sodium moves from the film to the glass.

On the basis of the above discussion, one should expect that if a soda lime glass were coated with an alumina barrier layer, sodium migration from the glass to the film would be very pronounced. The replacement of a hydroxyl group in the glass by a sodium-compensated, non-bridging oxygen is expected to change the energy by a lesser amount than the formation of a tetrahedrally bonded aluminum atom in the alumina film. The migration of sodium from the glass into the film is, indeed, observed.

The effect is similar when Corning Code 7059, an aluminoborosilicate glass, is coated with an alumina film. The reason can be easily understood in terms of the structure of that glass. Only the alkali metals, or large, low field strength alkaline earths in excess of the alumina, lead to formation of either non-bridging oxygen atoms, or tetrahedrally bonded boron atoms, in aluminoborosilicates. It is clear that formation of a tetrahedrally bonded aluminum atom is more stable than the alternative boron or NBO structural units. In the Code 7059 glass, all of the alumina is already in tetrahedral coordination. In the alumina film, any increase in alkali leads to an increase in tetrahedral alumina and therefore decreases the energy of the film. Thus, for the system comprised of glass Code 7059 coated with alumina, transport of alkali from glass to film is promoted.

If a silica film is utilized as a barrier layer, only non-bridging oxygen atoms can be formed by an increase in sodium ion concentration. The ratio of alkali concentration to proton concentration should correspondingly increase in the glass, and decrease in the film, when equilibrium is achieved. It is for this reason that alkali is found to diffuse from the silica film into glass Code 7059 in spite of the fact that the glass initially contains a higher alkali concentration than does the film.

The structural rules outlined above form the basis for predicting the direction of sodium movement by calculating the parameters $P^1$ for alumina and tantala films and $P$ for silica films. They are defined as:

$P^1=[Na^++Li^++K^++Cs^++Rb^+]+2[Sr^{2+}+Ba^{2+}+Ca^{2+}/2]-[Al^{3+}]$ $P=P^1-x[B^{3+}]-[Zn^{2+}+Be^{2+}+Mg^{2+}+Ca^{2+}/2]$

Concentrations are in cation percent. The $Ca^{2+}$ concentration is arbitrarily divided into two equal parts, network modifying and network forming. The value of x, the maximum fraction of boron atoms capable of being four coordinate, is taken to be 0.6 since the glass is well annealed. However, as indicated earlier, it may range from 0.5–0.7 depending on material conditions.

Alumina films behave differently from silica films with respect to sodium movement. One must consider the state of the aluminum atoms in the glass. If they are fully compensated so that they are all four coordinate, then sodium should move from the glass into the adjacent alumina film where four coordinate aluminas can be created. However, if the alkali, and alkaline earths which behave like alkalis, are insufficient to convert all the aluminums in the glass to four coordinate, then it is possible for sodium to move from the alumina film into the glass. Tantala films can be expected to behave similarly to alumina films.

The expressions for $P^1$ and $P$ are applied to sodium movement between a glass and a film deposited on the glass, in the following manner. $P^1$ is initially calculated because aluminum in the silicate glass is the first atom to change from three to four coordination. Note that the $Sr^{2+}$, $Ba^{2+}$, and part of the $Ca^{2+}$ act like alkali ions in the ability to modify a silicate network and charge compensate Al or B ions. Subtracting the Al ion concentration from the sum of the alkali metal and low field strength, alkaline earth ions gives a number $P^1$ which may be positive or negative. The sign of this number is used to determine the direction of sodium movement in the case of alumina films. If the number is negative, sodium moves from the film to the glass; if positive, from the glass to the film.

In the case of silica films, the Al, B, and alkaline earth ions which can enter the network all must be considered. The concentrations of all three are subtracted from the alkali and alkali-like ions to give a value of P. This can also be positive or negative. If positive, sodium moves from the glass into the silica; if negative, from the silica film into the glass. There is some uncertainty in both the division between the alkaline earth metal ions and the value of x, the fraction of boron atoms. Therefore, it is desirable to employ relatively high P or $P^1$ values for predictive purposes.

The invention is further described with respect to methods of practicing it. Noncrystalline alumina and silica films were applied to glass substrates by various methods to provide test samples. It will be appreciated, of course, that the particular methods described are not exhaustive. Any chemical or physical method that can form a thin, noncrystalline, solid oxide film on a glass surface is suitable for use in practicing the invention. These methods include sol-gel, chemical vapor deposition either plasma enhanced ((PECVD) or atmospheric pressure (APCVD), ion beam deposition, leaching, sputtering, evaporation, and cathodic arc.

Silica films were deposited by APCVD (C) from an atmosphere of silane and oxygen at 500° C. Plasma enhanced chemical vapor deposition (P) was also used to deposit a silica film. In this case, the substrate was exposed to a silane, nitrous oxide and argon atmosphere at 300° C. in the presence of an RF plasma.

Oxide films were also RF magnetron sputtered from the oxide (S) onto a rotating substrate at room temperature and at 0.6 milli Torr argon pressure. Both silica and alumina films were produced by these techniques. In addition, alumina films were produced by electron beam evaporation (E).

The samples thus produced were heat treated in a 6.5 cm diameter, fused silica tube with ends capped. Medical grade compressed air was bubbled through distilled water to provide a room temperature relative humidity of 98–100% during firing of the samples.

TABLE I sets forth, in weight percent, compositions for several glasses used as substrates. All substrates, except 1 and 8–11, contained about 1000 ppm by weight $Na_2O$. All had either as-formed or ground and polished surfaces, and were about 1 mm thick.

Anaylsis of sodium in the films was carried out using secondary ion mass spectrometry (SIMS). Profiling of the samples in depth was accomplished using negative oxygen ion bombardment. Sample constituents ejected from the surface were measured by a mass spectrometer. Standards were used to calibrate the instrument for sodium. Determinations were made of both the surface concentration of sodium and the total concentration integrated across the total thickness of the film. Integrated concentrations are included in TABLES II and III, infra.

TABLE I

| Oxide | 1 | 2 | 3 | 4 | 5 | 6 | 7 | 8 | 9 | 10 | 11 |
|---|---|---|---|---|---|---|---|---|---|---|---|
| $SiO_2$ | 72.1 | 49.5 | 57.2 | 56.8 | 56.9 | 57.8 | 66.4 | 72.1 | 56.3 | 70.3 | 62.0 |
| $Al_2O_3$ | 1.8 | 10.5 | 16.5 | 15.2 | 14.5 | 16.4 | 18.3 | 4.6 | 2.8 | 2.6 | 10.5 |
| $B_2O_3$ | — | 14.6 | 4.9 | 12.4 | 4.7 | 8.9 | — | 9.8 | 30.7 | 17.7 | 17.9 |
| BaO | — | 25.0 | 8.0 | 5.2 | 12.4 | 9.4 | 8.8 | 3.4 | — | — | — |
| SrO | — | — | — | 3.6 | 0.2 | 1.9 | — | — | — | — | — |
| CaO | 7.3 | — | 7.8 | 3.9 | 11.1 | 4.1 | 5.8 | 0.5 | — | — | — |
| MgO | 3.8 | — | 5.6 | 1.4 | — | 0.7 | — | — | — | — | — |
| ZnO | — | — | — | — | — | — | — | 2.7 | — | — | — |
| $K_2O$ | 0.2 | — | — | — | — | — | — | 0.6 | — | — | — |
| $Na_2O$ | 14.0 | 0.1 | 0.1 | 0.1 | 0.1 | 0.1 | 0.1 | 5.8 | 10.2 | 9.5 | 9.6 |
| $Li_2O$ | — | — | — | — | — | — | — | — | — | — | — |
| $As_2O_3$ | — | 0.5 | — | 1.5 | 0.8 | 0.8 | — | — | — | — | — |
| Cl | — | — | — | — | — | — | 0.5 | — | — | — | — |
| $SO_3$ | 0.3 | — | — | — | — | — | — | — | — | — | — |

TABLE II sets forth data for numerous silica film samples produced by various deposition methods on different glass substrates. The first column in TABLE II identifies the substrate glass with example numbers from TABLE I; column 2, the method of deposition and thickness of the film in nanometers (nm); column 3, the integrated total $Na_2O$ content of the film in ppm before heat treatment; column 4, the time/temperature cycle of the heat treatment in moist air in hours/°C.; column 5, the total ppm $Na_2O$ in the film after the heat treatment; column 6, the change (Δ) in $Na_2O$ content. A negative number indicates that sodium moves from the glass to the film; a positive number indicates movement in the opposite direction.

TABLE II

| Glass | Method | $Na_2O$ (ppm) | Time (hr) Temp (°C.) | $Na_2O$ (ppm) | $\Delta Na_2O$ |
|---|---|---|---|---|---|
| 2 | C/80 nm | 1830 | 25/650° | 524 | 1306 |
| 2 | S/100 nm | 325 | 25/350° | 291 | 34 |
| 2 | P/100 nm | 1130 | 25/650° | 66 | 1060 |
| 2 | C/100 nm | 453 | 1000/650° | 153 | 300 |
| 5 | C/100 nm | 527 | 25/650° | 121 | 406 |
| 1 | S/100 nm | 2130 | 25/350° | 7380 | −5250 |
| 9 | C/100 nm | 13100 | 25/500° | 8760 | 4340 |
| 10 | C/100 nm | 43400 | 25/500° | 27000 | 16400 |
| 11 | C/100 nm | 32600 | 25/500° | 8560 | 24000 |

C indicates atmospheric pressure chemical vapor deposition; P, plasma enhanced CVD; S, sputtered.

TABLE III presents similar data in similar manner for deposited alumina films.

TABLE III

| Glass | Method | $Na_2O$ (ppm) | Time (hr) Temp (°C.) | $Na_2O$ (ppm) | $\Delta Na_2O$ |
|---|---|---|---|---|---|
| 2 | S/100 | 9.4 | 25/650° | 17.9 | −8.5 |
| 2 | S/140 | 10.1 | 25/650° | 18.3 | −8.2 |
| 2 | C/230 | 2.4 | 140/650° | 113 | −110.6 |
| 5 | S/100 | 7.7 | 25/650° | 12.3 | −4.6 |
| 1 | S/100 | 6.8 | 140/520° | 15600 | −15593.2 |
| 3 | S/100 | 15.3 | 25/650° | 8.9 | 6.4 |

TABLE IV sets forth values for $P^1$ and P as calculated using the formulae set forth above.

TABLE IV

| CALCULATED VALUES OF $P^1$ AND P | | |
|---|---|---|
| Glass | $P^1$ | P |
| 1 | +28.8 | +20.5 |
| 2 | +7.6 | −7.9 |
| 3 | −4.3 | −21.1 |
| 4 | −5.0 | −20.8 |
| 5 | +5.1 | −5.8 |
| 6 | −4.9 | −16.9 |
| 7 | −8.4 | −11.6 |
| 8 | +8.9 | −2.4 |
| 9 | +12.5 | −11.5 |
| 10 | +12.5 | −2.5 |
| 11 | +5.0 | −10.0 |

A comparison of the data in TABLE IV with that in TABLES II and III demonstrates that the calculated values of $P^1$ and P do indeed correctly predict the direction of sodium movement.

Test results with certain borosilicate glasses that tend to phase separate under test conditions have been omitted. The results with these glasses were unpredictable, presumably because of changes in glass structure due to phase separation. Samples in which the film crystallized also were omitted.

In summary, we have discovered a materials system which can maintain or decrease the initial alkali concentration at the system/air interface. This is particularly useful in applications where sodium is a contaminant. For example, active matrix liquid crystal displays utilize thin film transistors fabricated on glass substrates. All commercial glasses contain tramp sodium at levels far above those allowed in the integrated circuit industry. Such sodium can be isolated from the thin film transistors by use of the present invention.

Another area of application is glassware for use in producing and dispensing pharmaceuticals and fine chemicals. Here, purity is essential. Glassware for these purposes can have controlled surface levels of alkali through the use of the present invention. Thus, leaching of alkali into the material is prevented.

We claim:

1. A materials system comprising a barrier layer oxide film selected from the group consisting of silica, alumina and tantala films deposited on a glass surface, the glass having a content of mobile alkali metal ions and a composition containing a sufficient amount of high field strength ions that can change coordination so that the following expressions, in cation percent values, $P^1=[Na^++Li^++K^++Cs^++Rb^+]+2[Sr^{2+}+Ba^{2+}+Ca^{2+}/2]-[Al^{3+}]$, in conjunction with an alumina or tantala film, and $P=P^1-0.6[B^{3+}]-[Zn^{2+}+Be^{2+}+Mg^{2+}+Ca^{2+}/2]$ in conjunction with a silica film, are negative, whereby the direction of any flow of a migrating alkali metal ion is toward the glass.

2. A materials system in accordance with claim 1 wherein the mobile alkali metal ions are sodium ions.

3. A materials system in accordance with claim 1 wherein the deposited film is alumina.

4. A materials system in accordance with claim 1 wherein the deposited film is silica.

5. A materials system in accordance with claim 1 wherein the glass contains aluminum ions and the expression $P^1$ is negative.

6. A materials system in accordance with claim 4 wherein the glass contains boron ions and the expression P is negative.

7. An LCD device having a glass panel with a barrier layer oxide film selected from the group consisting of silica, alumina and tantala films deposited on a surface of the panel, the glass having a content of mobile alkali metal ions and also containing a sufficient amount of high field strength ions that can change coordination so that the expressions, in cation percent values $P^1=[Na^++Li^++K^++Cs^++Rb^+]+2[Sr^{2+}+Ba^{2+}+Ca^{2+}/2]-[Al^{3+}]$ in conjunction with an alumina or tantala film, and $P=P^1-0.6[B^{3+}]-[Zn^{2+}+Be^{2+}+Mg^{2+}+Ca^{2+}/2]$ in conjunction with a silica film, are negative, whereby any flow of a migrating alkali metal ion is in the direction of the glass panel and the device is protected from alkali metal contamination.

8. An LCD device in accordance with claim 7 wherein the deposited film is silica.

9. An LCD device in accordance with claim 7 wherein the deposited film is alumina.

10. An LCD device in accordance with claim 7 wherein the glass contains aluminum ions and the expression $P^1$ is negative.

11. An LCD device in accordance with claim 8 wherein the glass contains boron ions and the expression P is negative.

12. A method of preventing the migration of alkali metal ions from a glass surface which comprises depositing a barrier layer oxide film selected from the group consisting of silica, alumina and tantala films on a glass containing high field strength ions that can change coordination, alkali metal ion flow being toward a glass having an alumina or tantala film being applied in combination with a glass having a composition such that the expression, in cation percent, $P^1=[Na^++Li^++K^++Cs^++Rb^+]+2[Sr^{2+}+Ba^{2+}+Ca^{2+}/2]-[Al^{3+}]$, is negative, and toward a silica film being applied in combination with a glass having a composition such that the expression $P=P^1-0.6[B^{3+}]-[Zn^{2+}+Be^{2+}+Mg^{2+}+Ca^{2+}/2]$, is negative.

13. A method in accordance with claim 12 which comprises depositing an alumina film on a glass having a $P^1$ value that is negative, whereby alkali metal ions tend to migrate toward the glass.

14. A method in accordance with claim 12 which comprises depositing a silica film on a glass having a P value that is negative, whereby alkali metal ions tend to migrate toward the glass.

15. A method in accordance with claim 12 wherein the migratory alkali metal ion is sodium.

16. A method of protecting a material from alkali metal ion contamination when the material is in contact with a glass containing migratory alkali metal ions which comprises applying a barrier layer oxide film selected from the group consisting of silica, alumina and tantala films to a glass containing high field strength ions that change coordination in sufficient amount so that the expressions, in cation percent values $P^1=[Na^++Li^++K^++Cs^++Rb^+]+2[Sr^{2+}+Ba^{2+}+Ca^{2+}/2]-[Al^{3+}]$, is negative when an alumina or tantala film is applied, and $P=P^1-0.6[B^{3+}]-[Zn^{2+}+Be^{2+}+Mg^{2+}+Ca^{2+}/2]$, is negative, when a silica film is applied to the glass surface in contact with the material being protected.

17. A method in accordance with claim 16 wherein the applied film is a silica film.

18. A method in accordance with claim 16 wherein the applied film is an alumina film.

* * * * *

UNITED STATES PATENT AND TRADEMARK OFFICE
CERTIFICATE OF CORRECTION

PATENT NO. : 5,578,103
DATED : November 26, 1996
INVENTOR(S) : Araujo et al.

It is certified that error appears in the above-identified patent and that said Letters Patent is hereby corrected as shown below:

Column 2, line 26, "2], in in" should read --2], in--.

Column 6, line 1, "$x[Bm^{3+}]$" should read --$x[B^{3+}]$--.

Signed and Sealed this

Twenty-fifth Day of February, 1997

BRUCE LEHMAN

*Attest:*

*Attesting Officer*     *Commissioner of Patents and Trademarks*